March 28, 1961 L. A. MATTHIES 2,976,750
MULTIPLE PIVOTED JAW PIPE WRENCH
Filed Jan. 8, 1960 2 Sheets-Sheet 1
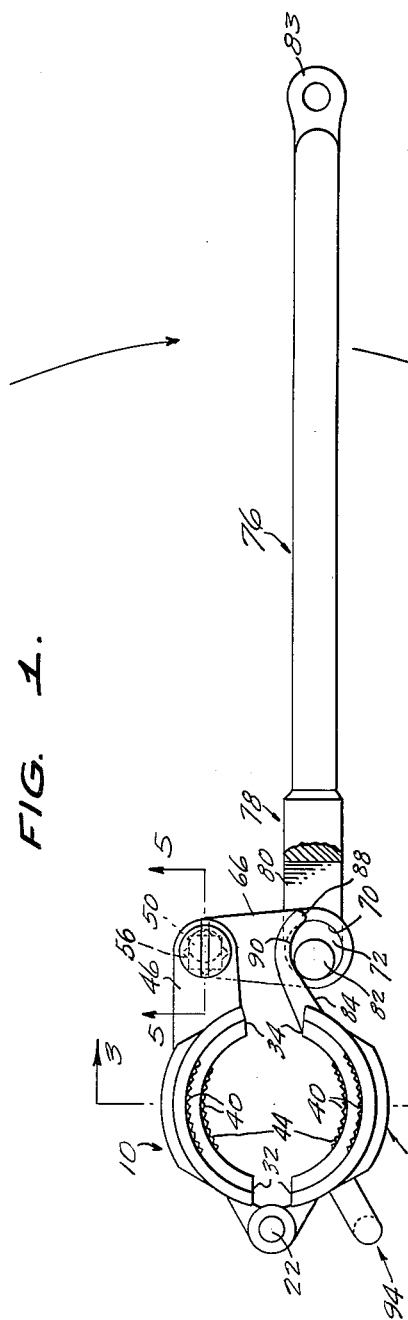
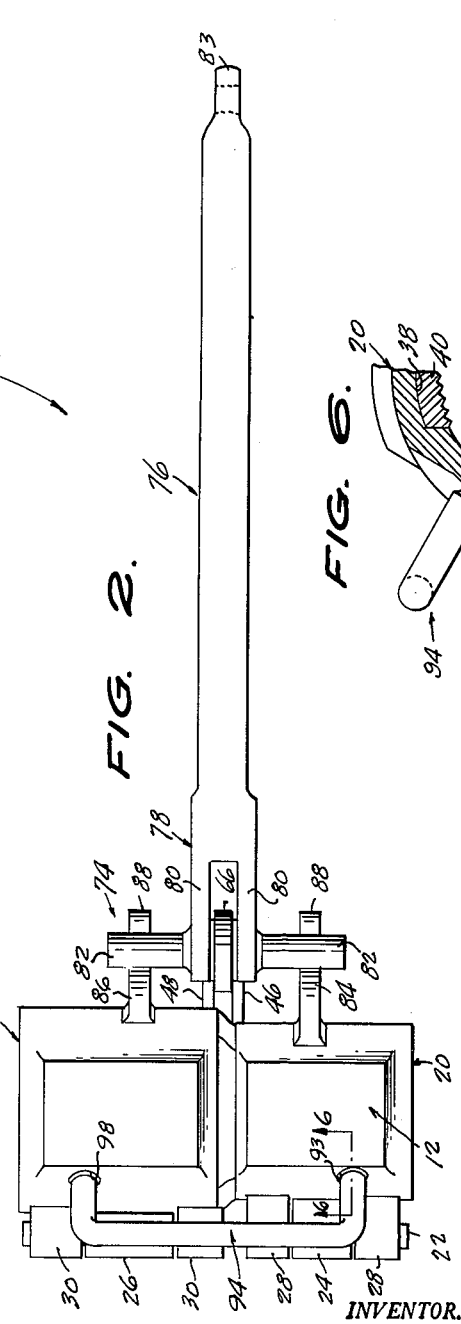
INVENTOR.
LEO A. MATTHIES,
BY
McMorrow, Berman & Davidson
ATTORNEYS.

March 28, 1961 L. A. MATTHIES 2,976,750
MULTIPLE PIVOTED JAW PIPE WRENCH
Filed Jan. 8, 1960 2 Sheets-Sheet 2

INVENTOR.
LEO A. MATTHIES,
BY
McMorrow, Berman & Davidson
ATTORNEYS.

United States Patent Office 2,976,750
Patented Mar. 28, 1961

2,976,750

MULTIPLE PIVOTED JAW PIPE WRENCH

Leo A. Matthies, Box 353, Glenrock, Wyo.

Filed Jan. 8, 1960, Ser. No. 1,222

7 Claims. (Cl. 81—53)

This invention relates to a novel and improved backing-up tongs for holding a pipe and a threaded coupling of a pipe joint stationary while another pipe is rotated to disconnect the same from the coupling.

The primary object of the invention is to provide a more efficient, simpler, and easily used device of the kind indicated which involves a pair of coupling gripping jaws and a pair of pipe gripping jaws, certain of the jaws being partially independent in action so as to be self-adjusting to the coupling and the pipe, both pairs of jaws being closed and turned by a single handle-operated eccentric assembly, and wherein, upon clamping of the jaws, equal gripping pressures are exerted on the coupling and on the pipe on which the coupling is threaded, as upon the coupling and a pipe positioned vertically in the ground, from which another or a surface pipe is to be disconnected, without rotationally displacing the ground pipe.

Another object of the invention is to provide, in a device of the character indicated above, eccentric rotatably adjustable pivot means in the eccentric assembly, which provides for taking up wear between components thereof.

Other important objects and advantageous features of the invention will be apparent from the following description and the accompanying drawings, wherein, for purposes of illustration only, a specific form of the invention is set forth in detail.

In the drawings:

Figure 1 is a side elevation of a device of the invention with its jaws closed and with arrows indicating the direction in which the handle is swung, relative to a pipe joint (not shown) for clamping the jaws, a portion being broken away and in section;

Figure 2 is a bottom plan view of Figure 1;

Figure 6 is an enlarged fragmentary section taken on the line 6—6 of Figure 2.

Figure 3:
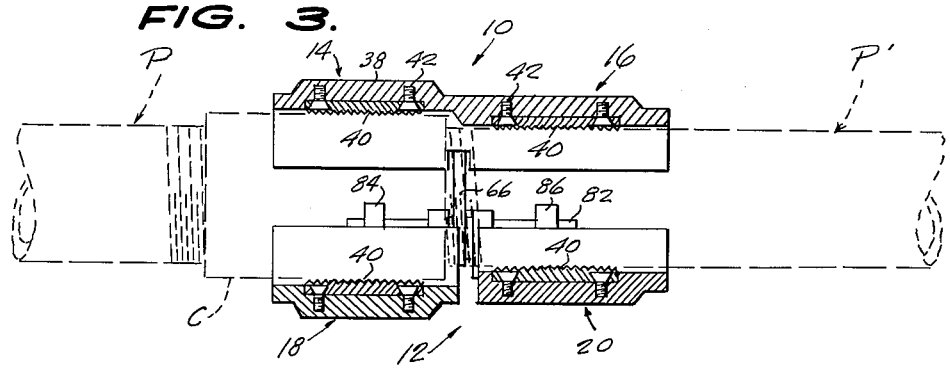
Figure 3 is a vertical transverse section taken on the line 3—3 of Figure 1, and showing a pipe joint in phantom lines, with related pairs of jaws applied to the coupling and a pipe thereof.

Referring in detail to the drawings, wherein like numerals designate like parts throughout the several views, the illustrated device comprises an upper one-piece jaw assembly 10 and an opposed lower sectional jaw assembly 12. The upper jaw assembly 10 comprises an arcuate coupling engaging jaw 14 and a stationary smaller diameter pipe engaging jaw 16 which is axially aligned with the jaw 14, the jaws 14 and 16 being fixed together at their adjacent ends and preferably being integral with each other.

Figure 4:
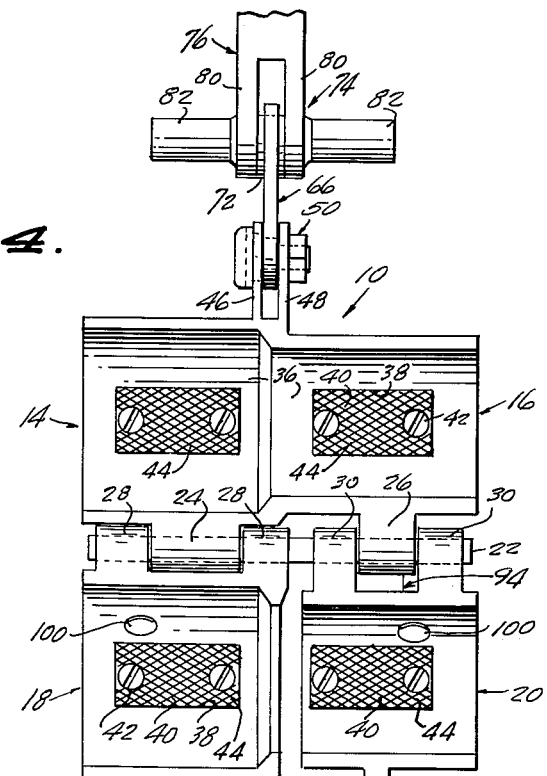
Figure 4 is a fragmentary plan view of the device showing the pairs of jaws in open position.

The lower sectional jaw assembly comprises an arcuate coupling engaging jaw 18, like and opposed to the jaw 14, and a movable pipe engaging jaw 20, like and opposed to the jaw 16, but the jaws 18 and 20 are separate pieces, and, as shown in Figure 4, the jaw 20 is slightly narrower than the jaw 16, and is axially spaced from the jaw 18, and is arranged to work independently of the jaw 18. This provision is made so that, in cases where pipes P, on which couplings C are threaded, are of differing diameters, the movable pipe engaging jaw 20 can move toward or away from the stationary pipe engaging jaw 16, relative to the coupling engaging jaws 14 and 18, so as to grip such pipe P with the same force with which the jaws 14 and 18 engage the coupling C, for holding the pipe P and the coupling C against rotation while the other pipe P' is rotated for coupling or uncoupling the same from the coupling C.

The jaw assemblies 10 and 12 are hinged together at their inward edges on a single, preferably uniform diameter hinge pin 22. The jaws 14 and 16 of the assembly 10 have single hinged lugs 24 and 26, respectively, projecting from their inward edges and journalled on the hinge pin 22. The jaws 18 and 20 of the assembly 12 have pairs of hinge lugs 28, 28 and 30, 30 projecting from their inward edges and journalled on the hinge pin 22, between and in abutting relationships to the ends of the single lugs 24 and 26, respectively. As shown in Figure 1, the inward edges 32 of the jaw assemblies 10 and 12 are in substantially spaced relationship to each other, in the closed position of the jaw assemblies, as are the outward ends 34 of the jaw assemblies.

The concave surfaces 36 of the various jaws are formed with central recesses 38 in which are inserted hard pipe-gripping blocks 40, which are secured in place, as by means of studs 42, and which have projecting serrated gripping surfaces 44.

Figure 5:
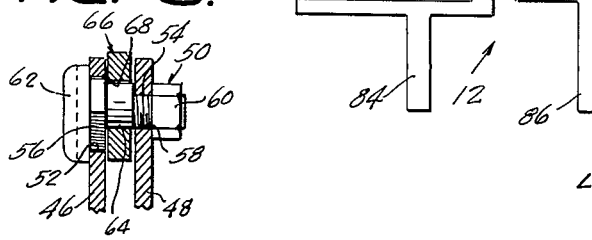
Figure 5 is an enlarged fragmentary horizontal section taken on the line 5—5 of Figure 1.

Fixed to the exterior of the upper jaw assembly 10, at the junction of the jaws 14 and 16 thereof, and at the outer edge 32, is a pair of spaced tangential lever arms 46 and 48, which, as shown in Figure 5, are traversed by an adjustable eccentric bolt 50. The arm 46 is formed with a relatively large diameter opening 52 and the arm 48 is formed with a substantially smaller opening 54 which is axially aligned with the opening 52. The bolt 50 comprises a square collar 56 which is engaged in the larger opening 52 and is in axial alignment with a threaded shank 58 which is engaged through the smaller opening 54, and has threaded thereon a nut 60, which is opposed to an enlarged diameter round head 62, the nut 60 and the head 62 being engaged with the outer sides of the arms 48 and 46, respectively. The bolt 50 has a cylindrical body 64 which is located between and is eccentric with respect to the shank 58 and the squared collar 56 and substantially takes up the space between the arms 46 and 48.

A vertical preferably flat bar link 66 is journalled at its upper end on the eccentric body 64, between the tangential lever arms 46 and 48, and the effective length of the link 66 can be changed, or wear taken up between the eccentric body 64 and the opening 68 of link 66, engaged thereon; by rotating the bolt 50 and hence its eccentric body 64.

The other end of the link 66 has an opening 70 which is journalled on a cylindrical enlargement 72 at the center of a cross head 74 which is located on the forward end of a single elongated operating handle bar 76. The handle bar 76 has an enlarged cross-section portion 78 at its forward end which is bifurcated to provide a pair of laterally spaced longitudinal arms 80, between which the enlargement 72 and the link 66 are located. The cross head 74 includes the enlargement 72 and round stub shafts 82 which are fixed to the ends of the enlargement 72, are similarly eccentric relative thereto, and are axially aligned with each other, and extend non-rotatably through the handle bar arms 80, and reach beyond opposite sides of the handle bar. The handle bar 76 can have an apertured hanging ear 83 on its rear end.

Fixed severally on the exteriors of the jaws 18 and 20 of the lower jaw assembly 12, at points intermediate the ends of and at ends projecting beyond the outward edges of these jaws, are cam arms 84 and 86, respectively, which have free ends 88 and longitudinally concaved undersurfaces or cam edges 90. The arms 84, 86 are of substantially the same effective length as the lever arms 46 and 48, and are proportioned and arranged to engage over related ones of the stub shafts 82 of the handle bar crosshead 74, as shown in Figures 1 and 2, when the jaw assemblies 10 and 12 and the handle bar 76 are positioned relative to each other for a clamping operation. A bail handle 94 extends along the outer surfaces of the jaws 18 and 20 to facilitate opening these jaws, and is loosely connected at its ends to these jaws, as shown in Figure 6, by means of reduced shanks 96 extending loosely through radial bores 98, with enlarged heads 100 engaged with the inward sides of the jaws, so that the jaws 18 and 20 have limited freedom of movement relative to each other.

In operation, the jaw assemblies 10 and 12 having been applied to diametrically opposed surfaces of a coupling C and a pipe P' secured therein, with the jaw assembly 10 uppermost, the handle bar 76 is swung downwardly, as indicated in Figure 1, so that the eccentric stub shafts 82 push up on the concave undersurfaces of the arms 84 and 86 of the lower jaw assembly 12, at the same time that the stub shafts 82 are rotated, in a clockwise direction, so that the stub shafts push the arms 84 and 86 further upwardly, while upward or receding movement of the upper jaw assembly 10 is prevented by the non-yielding connection of the link 66 between the enlargement 72 and the bolt 50. This results in forcible and controlled approach of the lower jaw assembly 12 toward the upper jaw assembly 10, whereby the pipe joint components are gripped therebetween. Relaxation of the grip of the jaw assemblies on the pipe joint is produced by swinging the handle bar 76 in the opposite or upward direction, in Figure 1, whereupon the handle bar 76 can be pulled in a direction away from the jaw assemblies so as to disengage the eccentric stub shafts 82 from the lower jaw assembly arms 84 and 86, and the jaw assemblies can be swung freely away from each other.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A coupling and uncoupling pipe tongs comprising a first one-piece jaw assembly, a second sectional jaw assembly, each of said assemblies having an arcuate pipe coupling engaging jaw and a smaller diameter arcuate pipe engaging jaw, the jaws of the sectional assembly being unconnected with each other, means hinging the separate jaws of the sectional assembly to the one-piece assembly, and lever-operated eccentric means mounted on one assembly and operatively engageable with the other jaw assembly.

2. A coupling and uncoupling pipe tongs, comprising a one-piece jaw assembly and a sectional jaw assembly, said assemblies having inner and outer longitudinal sides, means hinging the assemblies together at their inward sides including a hinge pin, said one-piece jaw assembly having a relatively large diameter arcuate pipe coupling jaw and a smaller diameter arcuate pipe engaging jaw fixed in permanent alignment with each other, said sectional jaw assembly having a relatively large diameter arcuate coupling engaging jaw opposed to the other coupling engaging jaw and a smaller diameter arcuate pipe engaging jaw opposed to the other pipe engaging jaw, the jaws of the sectional assembly being separate and unconnected to each other and individually journalled on the hinge pin, fixed lever arm means on the one-piece jaw extending beyond the outer edge thereof, a link having a first end pivoted on said lever arm means, said link having a second end, an elongated operating handle bar having a forward end, a fixed crosshead on said forward end having a central cylindrical member on which the second end of the link is journalled, said crosshead having stub shafts extending beyond opposite sides of the handle bar, said stub shafts being similarly eccentric with respect to the axis of said central cylindrical member, and fixed cam arms on the jaws of the sectional jaw assembly and projecting beyond the outer edges thereof, said cam arms being severally engaged with stub shafts at opposite sides of the handle bar, said cam arms having cam edges engaged with the sides of the stub shafts facing the one-piece jaw assembly.

3. A coupling and uncoupling pipe tongs, comprising a one-piece jaw assembly and a sectional jaw assembly, said assemblies having inner and outer longitudinal sides, means hinging the assemblies together at their inward sides including a hinge pin, said one-piece jaw assembly having a relatively large diameter arcuate pipe coupling jaw and a smaller diameter arcuate pipe engaging jaw fixed in permanent alignment with each other, said sectional jaw assembly having a relatively large diameter arcuate coupling engaging jaw opposed to the other coupling engaging jaw and a smaller diameter arcuate pipe engaging jaw opposed to the other pipe engaging jaw, the jaws of the sectional assembly being separate and unconnected to each other and individually journalled on the hinge pin, fixed lever arm means on the one-piece jaw extending beyond the outer edge thereof, a link having a first end pivoted on said lever arm means, said link having a second end, an elongated operating handle bar having a forward end, a fixed crosshead on said forward end having a central cylindrical member on which the second end of the link is journalled, said crosshead having stub shafts extending beyond opposite sides of the handle bar, said stub shafts being similarly eccentric with respect to the axis of said central cylindrical member, and fixed cam arms on the jaws of the sectional jaw assembly and projecting beyond the outer edges thereof, said cam arms being severally engaged with stub shafts at opposite sides of the handle bar, said cam arms having cam edges engaged with the sides of the stub shafts facing the one-piece jaw assembly, means pivoting the first end of the link on the lever arm means comprising a bolt extending through said first end and through the lever arm means, said bolt having an eccentric portion on which the first end of the link is journalled.

4. A coupling and uncoupling pipe tongs, comprising a one-piece jaw assembly and a sectional jaw assembly, said assemblies having inner and outer longitudinal sides, means hinging the assemblies together at their inward sides including a hinge pin, said one-piece jaw assembly having a relatively large diameter arcuate pipe coupling jaw and a smaller diameter arcuate pipe engaging jaw fixed in permanent alignment with each other, said sectional jaw assembly having a relatively large diameter arcuate coupling engaging jaw opposed to the other coupling engaging jaw and a smaller diameter arcuate pipe engaging jaw opposed to the other pipe engaging jaw, the jaws of the sectional assembly being separate and unconnected to each other and individually journalled on the hinge pin, fixed lever arm means on the one-piece jaw extending beyond the outer edge thereof, a link having a first end pivoted on said lever arm means, said link having a second end, an elongated operating handle bar having a forward end, a fixed crosshead on said forward end having a central cylindrical member on which the second end of the link is journalled, said crosshead having stub shafts extending beyond opposite sides of the handle bar, said stub shafts being similarly eccentric with respect to the axis of said central cylindrical member, and fixed cam arms on the jaws of the sectional jaw assembly and projecting beyond the outer edges thereof, said cam arms being severally engaged with stub shafts at opposite sides of the handle bar, said cam arms having cam edges engaged with the sides of the stub shafts facing the one-piece jaw assembly, said cam arm cam surfaces being longitudinal concave in contour, and said cam arms having free ends.

5. A coupling and uncoupling pipe tongs, comprising a one-piece jaw assembly and a sectional jaw assembly, said assemblies having inner and outer longitudinal sides, means hinging the assemblies together at their inward sides including a hinge pin, said one-piece jaw assembly having a relatively large diameter arcuate pipe coupling jaw and a smaller diameter arcuate pipe engaging jaw fixed in permanent alignment with each other, said sectional jaw assembly having a relatively large diameter arcuate coupling engaging jaw opposed to the other coupling engaging jaw and a smaller diameter arcuate pipe engaging jaw opposed to the other pipe engaging jaw, the jaws of the sectional assembly being separate and unconnected to each other and individually journalled on the hinge pin, fixed lever arm means on the one-piece jaw extending beyond the outer edge thereof, a link having a first end pivoted on said lever arm means, said link having a second end, an elongated operating handle bar having a forward end, a fixed crosshead on said forward end having a central cylindrical member on which the second end of the link is journalled, said crosshead having stub shafts extending beyond opposite sides of the handle bar, said stub shafts being similarly eccentric with respect to the axis of said central cylindrical member, and fixed cam arms on the jaws of the sectional jaw assembly and projecting beyond the outer edges thereof, said cam arms being severally engaged with stub shafts at opposite sides of the handle bar, said cam arms having cam edges engaged with the sides of the stub shafts facing the one-piece jaw assembly, the lever arms and the cam arms being of substantially the same effective lengths, with said link extending lengthwise being the lever arms and the central cylindrical member of the cross head, in closed positions of the jaw assemblies.

6. A coupling and uncoupling pipe tongs, comprising a one-piece jaw assembly and a sectional jaw assembly, said assemblies having inner and outer longitudinal sides, means hinging the assemblies together at their inward sides including a hinge pin, said one-piece jaw assembly having a relatively large diameter arcuate pipe coupling jaw and a smaller diameter arcuate pipe engaging jaw fixed in permanent alignment with each other, said sectional jaw assembly having a relatively large diameter arcuate coupling engaging jaw opposed to the other coupling engaging jaw and a smaller diameter arcuate pipe engaging jaw opposed to the other pipe engaging jaw, the jaws of the sectional assembly being separate and unconnected to each other and individually journalled on the hinge pin, fixed lever arm means on the one-piece jaw extending beyond the outer edge thereof, a link having a first end pivoted on said lever arm means, said link having a second end, an elongated operating handle bar having a forward end, a fixed crosshead on said forward end having a central cylindrical member on which the second end of the link is journalled, said crosshead having stub shafts extending beyond opposite sides of the handle bar, said stub shafts being similarly eccentric with respect to the axis of said central cylindrical member, and fixed cam arms on the jaws of the sectional jaw assembly and projecting beyond the outer edges thereof, said cam arms being severally engaged with stub shafts at opposite sides of the handle bar, said cam arms having cam edges engaged with the sides of the stub shafts facing the one-piece jaw assembly, the lever arms and the cam arms being of substantially the same effective lengths, with said link extending lengthwise being the lever arms and the central cylindrical member of the crosshead, in closed positions of the jaw assemblies, and substantially normal to the handle bar.

7. A coupling and uncoupling pipe tongs comprising a first one-piece jaw assembly, a second sectional jaw assembly, each of said assemblies having an arcuate pipe coupling engaging jaw and a smaller diameter arcuate pipe engaging jaw, the jaws of the sectional assembly being unconnected with each other, means hinging the separate jaws of the sectional assembly to the one-piece assembly, and lever-operated eccentric means mounted on one assembly and operatively engageable with the other jaw assembly, and a bail handle extending across and between said separate jaws, and means loosely and severally connecting said handle at its ends to related ones of the separate jaws.

References Cited in the file of this patent

UNITED STATES PATENTS

| | | |
|---|---|---|
| 1,259,670 | Richard | Mar. 19, 1918 |
| 1,476,341 | Le Bus et al. | Dec. 4, 1923 |
| 1,693,064 | Lipton | Nov. 27, 1928 |
| 2,448,221 | Jones | Aug. 31, 1948 |
| 2,450,967 | Keiser | Oct. 12, 1948 |
| 2,557,202 | Raymond et al. | June 19, 1951 |
| 2,737,839 | Paget | Mar. 13, 1956 |
| 2,886,996 | Peterson | May 19, 1959 |